(12) United States Patent
Nakamura et al.

(10) Patent No.: US 6,603,576 B1
(45) Date of Patent: Aug. 5, 2003

(54) METHOD AND APPARATUS FOR SUPERIMPOSING ADDITIONAL INFORMATION WITH IMAGE SIGNAL

(75) Inventors: Masashi Nakamura, Chiba (JP); Akira Ogino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/335,641

(22) Filed: Jun. 18, 1999

(30) Foreign Application Priority Data

Jun. 19, 1998 (JP) .......................................... 10-172944

(51) Int. Cl.$^7$ ................................................ H04L 9/00
(52) U.S. Cl. ...................................... 358/3.28; 358/3.22
(58) Field of Search ...................... 358/3.28, 3.13–3.22, 358/1.9, 448; 382/237

(56) References Cited

U.S. PATENT DOCUMENTS

| | | | | |
|---|---|---|---|---|
| 5,889,868 A | * | 3/1999 | Moskowitz et al. ........ | 382/251 |
| 5,930,369 A | * | 7/1999 | Cox et al. ................... | 283/113 |
| 6,219,634 B1 | * | 4/2001 | Levine ..................... | 704/200.1 |
| 6,272,634 B1 | * | 8/2001 | Tewfik et al. ............... | 380/207 |

* cited by examiner

Primary Examiner—Thomas D. Lee
Assistant Examiner—Stephen Brinich
(74) Attorney, Agent, or Firm—Frommer Lawrence & Haug LLP; William S. Frommer; Glenn F. Savit

(57) ABSTRACT

A method and apparatus for superimposing additional information onto image information in a manner such that the additional information is inconspicuous on the displayed image. The additional information is spread throughout the image signal via logical operation with a pseudo-random code sequence. A dithering process is performed on the spread additional information in which masking patterns are randomly applied to mask some pixels from superimposition, thereby reducing the effective level of the additional information signal. High frequency random noise is added to the dithered additional information to further reduce the perceptible effect of the additional information on the image. The dithered and noise-added additional information signal is superimposed with the image signal, and recorded on a storage medium.

14 Claims, 7 Drawing Sheets

Strength = 1

Strength = 0.75

Strength = 0.5

Strength = 0.25

FIG. 4
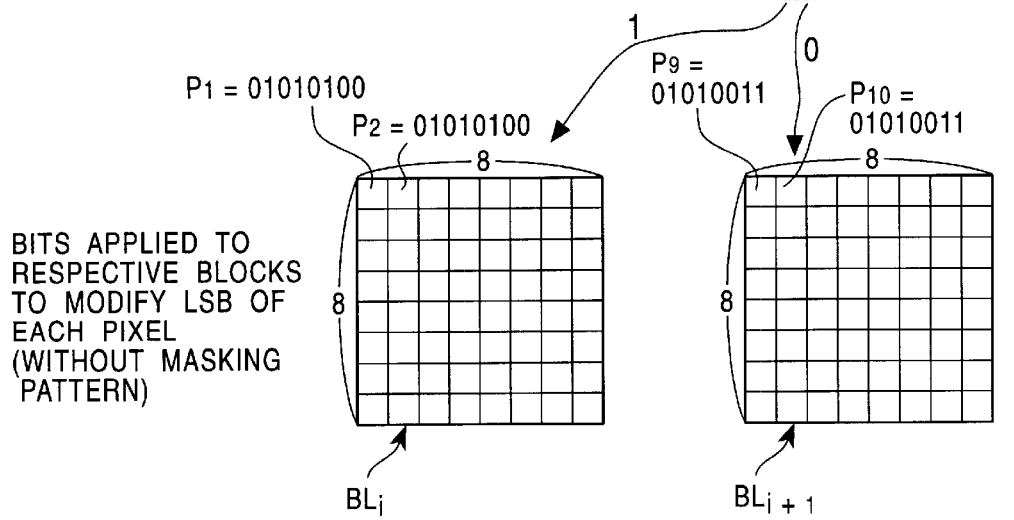
BITS APPLIED TO RESPECTIVE BLOCKS TO MODIFY LSB OF EACH PIXEL (WITHOUT MASKING PATTERN)
MASKING PATTERNS APPLIED
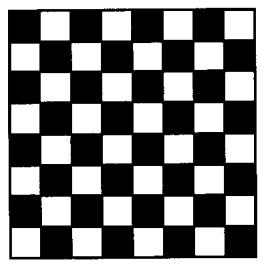
Strength = 0.5
(APPLIED TO $BL_i$)
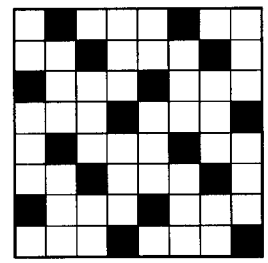
Strength = 0.75
(APPLIED TO $BL_{i+1}$)
MODIFIED PIXEL DATA WITH PN / ADDITIONAL CODE AND MASKING PATTERN APPLIED
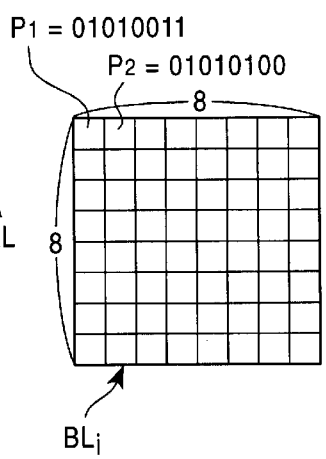
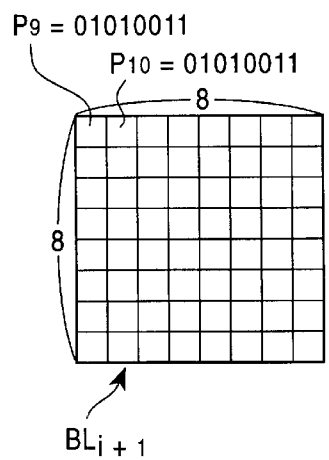

FIG. 5

| AMOUNT OF NOISE ADDITION | ADDITION RATIO |
|---|---|
| +2 | 10 % |
| +1 | 20 % |
| 0 | 40 % |
| −1 | 20 % |
| −2 | 10 % |

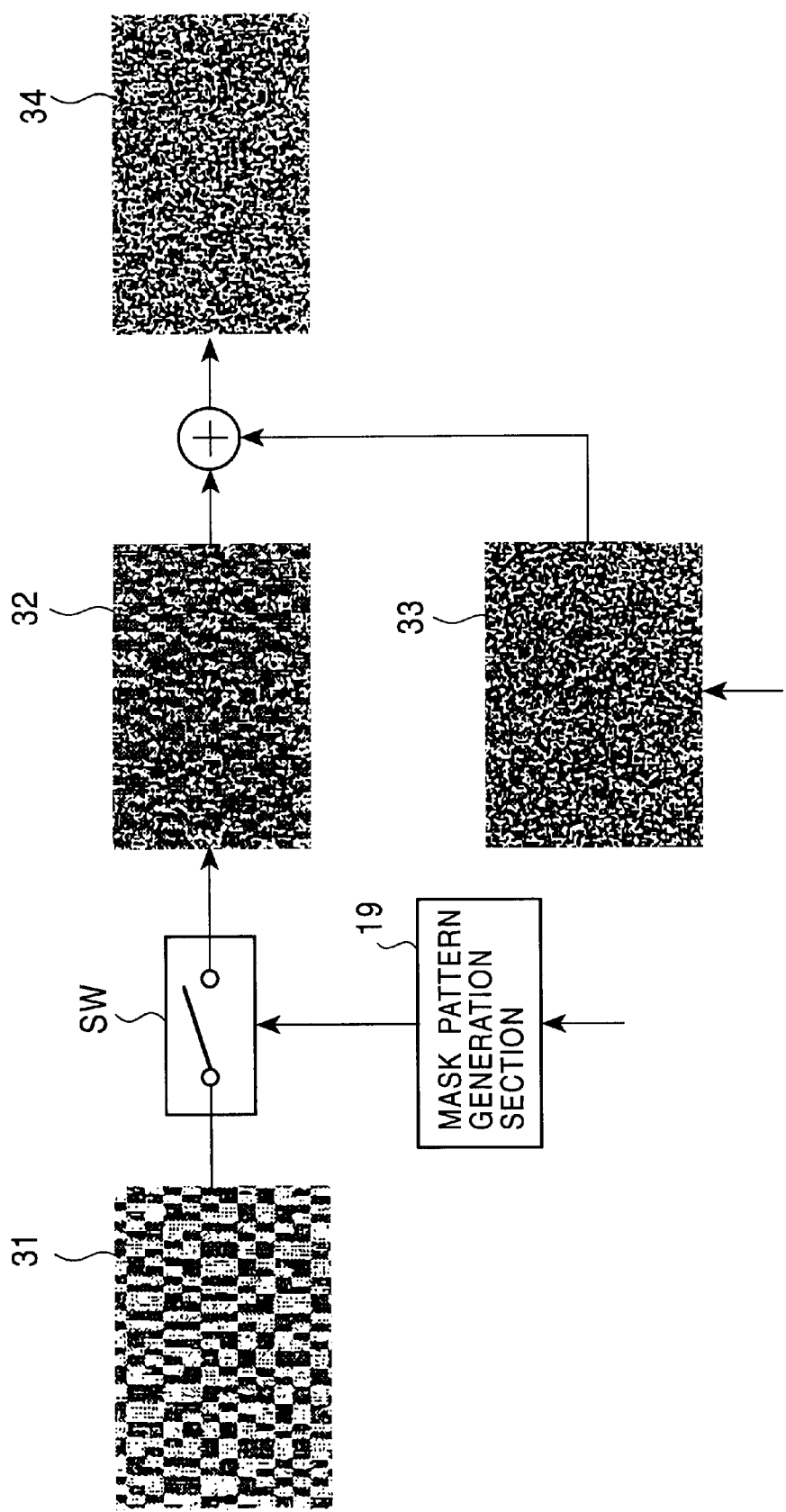

FIG. 8A
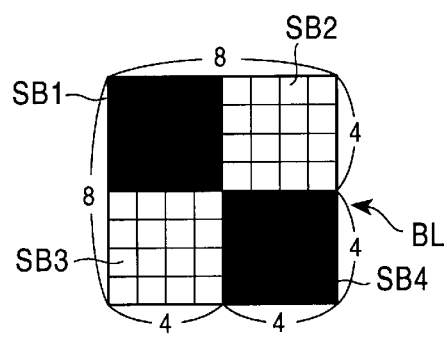
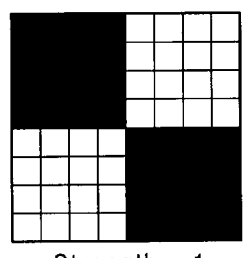
Strength = 1
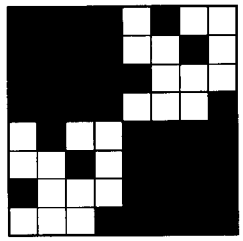
Strength = 0.75
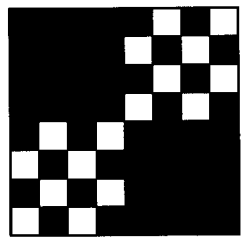
Strength = 0.5
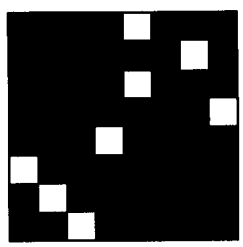
Strength = 0.25
FIG. 8B
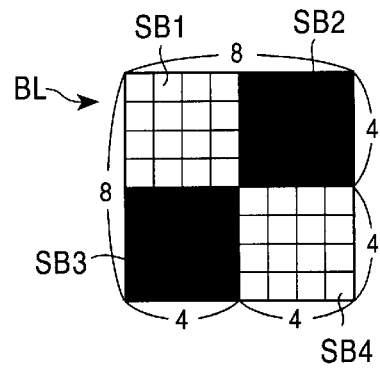
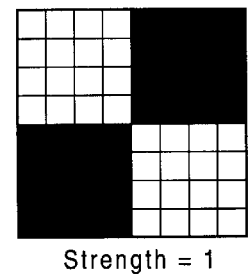
Strength = 1
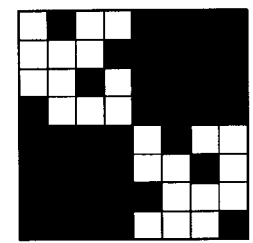
Strength = 0.75
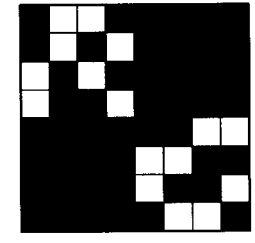
Strength = 0.5
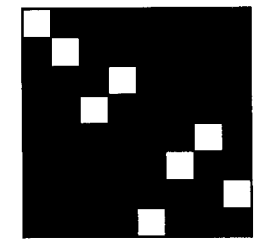
Strength = 0.25

METHOD AND APPARATUS FOR SUPERIMPOSING ADDITIONAL INFORMATION WITH IMAGE SIGNAL

FIELD OF THE INVENTION

The present invention pertains to superimposing additional information, such as copy control information, onto image information in an inconspicuous manner.

BACKGROUND

With the widespread use of digitally stored material in recent years, such as on Internet databases and portable storage media as digital video discs (DVDs), copyright infringement of such material has become problematic. One method that has been commonly used to mitigate this problem is to store copy control information as additional information along with the digital content on the storage medium. The copy control information typically consists of a code containing two or more bits indicating a copy generation number of the storage medium and/or whether copying of the storage medium contents is permitted. In any event, it is desirable to prevent a potential pirate from knowing and/or altering the additional information.

As a method for superimposing additional information with digitally stored image information, a digital watermark process has attracted attention from the point of view of difficulty of falsification of the additional information. See, for example, the February 24 issue of "Nikkei Electronics" magazine, 1997, No. 683, which describes contemporary digital watermark techniques and their advantages.

The digital watermark process is a process for embedding additional information as noise directly onto image data in a manner whereby the additional information is largely imperceptible to a viewer. The additional information embedded in the image data by such a digital watermark process is not easily removed from the image data, nor can it be easily altered. Advantageously, even after a filtering or data compression process is performed on the image data, with the proper decoding system it is possible to detect and utilize the additional information embedded therein.

Additional information that is superimposed onto an image signal by a digital watermark process is not removed from the image signals when the corresponding image is displayed on a display. Consequently, to prevent degradation of the reproduced image, the additional information should be superimposed onto the image signal at a very low level. For many digital image reproduction systems, however, some degradation of image quality is inevitable when conventional digital watermark techniques are employed. As another consideration, it is important that digital watermark information be detected reliably from the main information signals, even if the superimposition level is low. That is, it is desired that the probability of erroneous detection of the additional information is as low as possible.

SUMMARY OF THE INVENTION

In view of the above, it is an object of the present invention to provide a way to superimpose additional information with an image signal in a manner such that the additional information is inconspicuous on the displayed image, while maintaining the condition that the detection of the additional information can be performed reliably.

It is another object of the present invention to provide an improved digital watermarking method and apparatus.

To achieve the above and other objects, in an illustrative embodiment of the invention there is provided an additional information superimposition apparatus and method in which a dithering process is performed on additional information of a very low level to be added to image information. Prior to the dithering operation, input additional information may be spread out in time via logical operation of an input additional information signal of only a few bits with a pseudo-random code sequence of many bits. In the dithering process, masking patterns are randomly applied to blocks or screens of pixels to mask some of the pixels from superimposition, thereby reducing the effective level of the additional information signal. High frequency random noise is added to the dithered additional information to further reduce the perceptible effect of the additional information on the image. The dithered and noise-added additional information signal is then superimposed with the image signal, and recorded on a storage medium.

The high frequency random noise may be applied to blocks or screens of pixels by randomly selecting among a plurality of random noise patterns of predetermined different noise addition quantities.

In another aspect of the invention, each bit of the additional information is associated with a pixel block region, and individual block regions are divided into sub-block regions. A pattern of sub-block regions is defined for each block region, where the pattern corresponds to the value (one or zero) of the additional information bit associated with that block region. Pixels that are not included in the pattern of sub-block regions are not to be superimposed with the additional information. As a result, the level of the superimposed additional information is further reduced. A dithering process then determines which pixels of the pattern of sub-blocks are to be masked from being superimposed with the additional information.

The above and further objects, aspects and novel features of the invention will become more apparent from the following detailed description when read in connection with the accompanying drawings.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 4 is a diagram further illustrating additional information superimposition and masking using a specific example;

FIG. 5 is a table showing different noise addition quantities that can be used in the embodiment of the present invention;

FIG. 7 is a diagram illustrating the effect of additional information, dithering and random noise addition to an image according to the embodiment of the present invention; and FIGS. 8A and 8B are diagrams illustrating an alternative embodiment of the invention which defines sub-blocks of pixels to which additional information may be superimposed.

DETAILED DESCRIPTION OF PREFERRED EMBODIMENTS

Illustrative embodiments of the present invention will be now be described with reference to the accompanying drawings. Briefly, the embodiments employ a digital watermark process to obscure an additional information signal such as a copy prevention control signal. The additional information signal, e.g., a code of a few bits, is spread out in time by converting the few bits to a large number of bits using a spreading technique. The spread additional information is to be superimposed with an image signal. To render the thus spread additional information inconspicuous on a display, a masking/dithering technique is implemented in which different masking patterns are applied to respective pixel blocks on a random basis. In addition, high frequency noise is added to further diminish the perceptible effects of the spread additional information on the image.

In the below-described embodiment, a pseudo-random noise (PN) code is generated at a sufficiently early cycle and is multiplied by an additional information signal such as a two bit copy prevention control signal. This produces a spread or "distributed" additional information signal in which the additional information is contained within a code of many bits superimposed throughout the image signal. The spread additional information signal is a very low level signal that does not exert much influence on the image signal. High frequency noise is preferably added to the spread signal to further diminish the visual effect of the additional information signal when added to the image signal. The image signal is in a baseband state (analog or digital) when the noise-added, spread additional information signal is superimposed with it.

Thus, with the method disclosed herein, since a spread additional information signal of about the same frequency range of an image signal is superimposed within the same time period as the image signal, it is difficult for a person attempting illegal copying to remove the spread additional information signal from the image signal. On the other hand, by using a proper decoding system employing the same PN code used for the spreading technique, it is possible to detect and utilize the superimposed additional information signal by performing inverse spreading on the composite signal.

Figure 1:
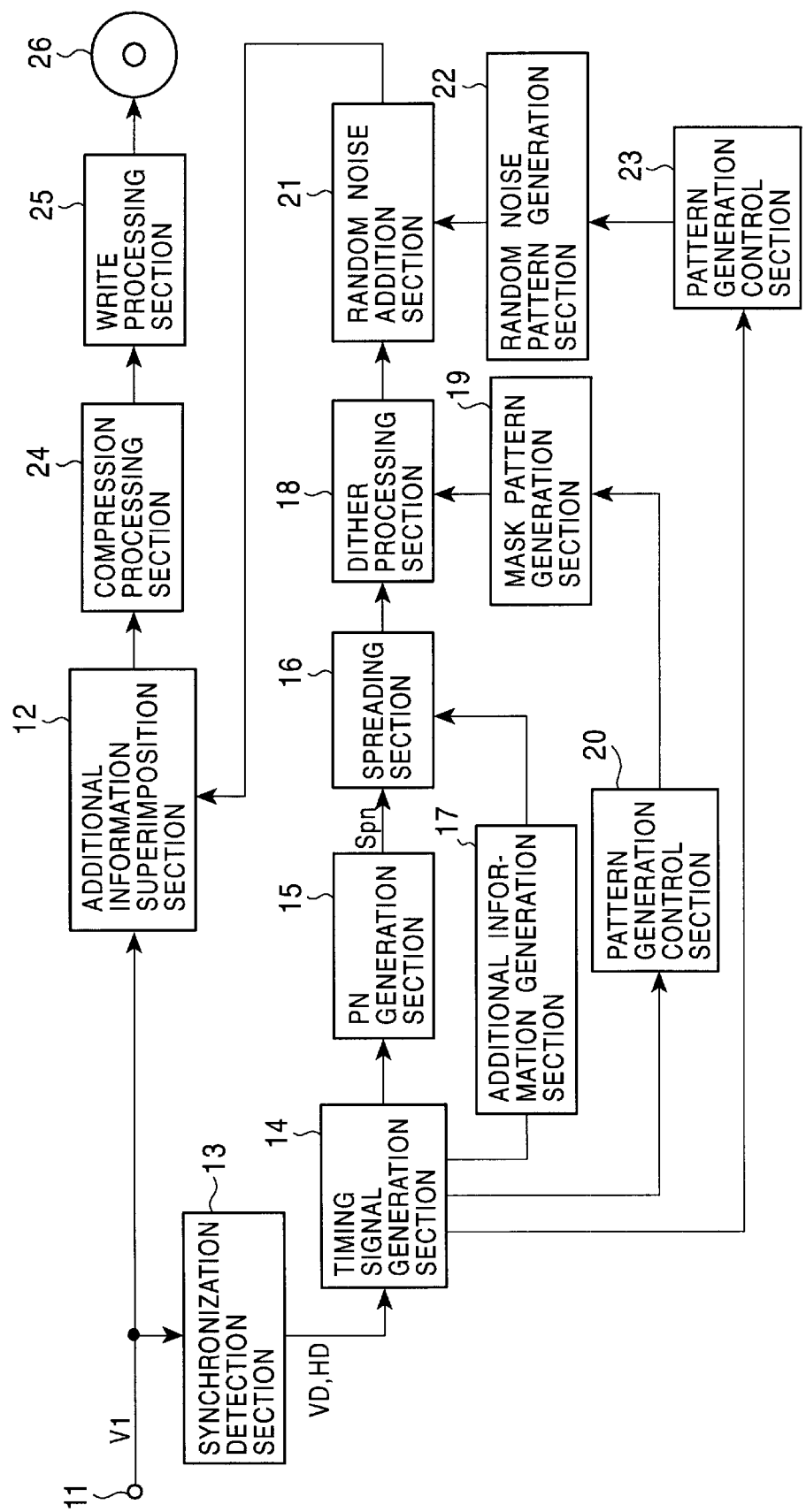
FIG. 1 is a block/flow diagram of an apparatus/method for superimposing additional information with an image signal according to an embodiment of the present invention.

Referring now to FIG. 1, a block/flow diagram of an illustrious additional information superimposition and recording apparatus/method in accordance with the invention is shown. In the example presented, a copy prevention control signal is superimposed as additional information onto an image signal, e.g., a digital video signal Vi of the NTSC protocol. The various sections 12–23 in FIG. 1 may be implemented in software and/or hardware.

Video signal Vi is input through an input terminal 11 and supplied to both an additional information superimposition section 12 and to a synchronization detection section 13. A vertical synchronization timing signal VD and a horizontal synchronization timing signal HD are detected by synchronization detection section 13. These signals VD, HD are supplied to a timing signal generation section 14 which generates various timing signals that are synchronized with signals VD and HD.

PN generation section 15 generates a PN code sequence Spn that is reset with each vertical cycle (in this example), in synchronization with a timing signal from the timing signal generation section 14. The PN code sequence Spn is output to a spreading section 16, which also receives an additional information signal generated by additional information generation section 17. Spreading section 16 spreads the additional information signal over time in accordance with the PN sequence Spn, preferably by multiplying it with sequence Spn, to thereby generate a spread spectrum additional information signal.

By way of example, the additional information signal can be a code representing copy control information, e.g., corresponding to permissible copying operations such as "Copy Free", One Copy", "No Copy", etc. The copy control information is determined in accordance with a video signal to be recorded. The copy control code is a predetermined number of bits, and the timing of each bit is preferably controlled according to a timing signal from timing signal generation section 14. Each bit may be superimposed over one or more fields, e.g., five fields. For instance, for a two bit code and a five field superimposition choice, the entire two bit code is superimposed over 2×5=10 fields. Hence, spreading section 16 multiplies the first bit of the code by PN sequence Spn for five fields, and then multiplies the second bit with Spn for the next five fields. This spreading process may be repeated for the duration of the video signal.

The spread additional information signal (hereafter, the "spread signal") generated in the above manner is supplied to a dither processing section 18 which functions to reduce the visible effect of the spread signal on the subsequent image. A mask pattern generated by a mask pattern generation section 19 is supplied to dither processing section 18, and a dithering process is performed. In this example, a number of different of types of mask patterns are generated in the mask pattern generation section 19. At any instant, the type of mask pattern supplied to dither processing section 18 is selected in accordance with a control signal from a pattern generation control section 20.

Figure 2:
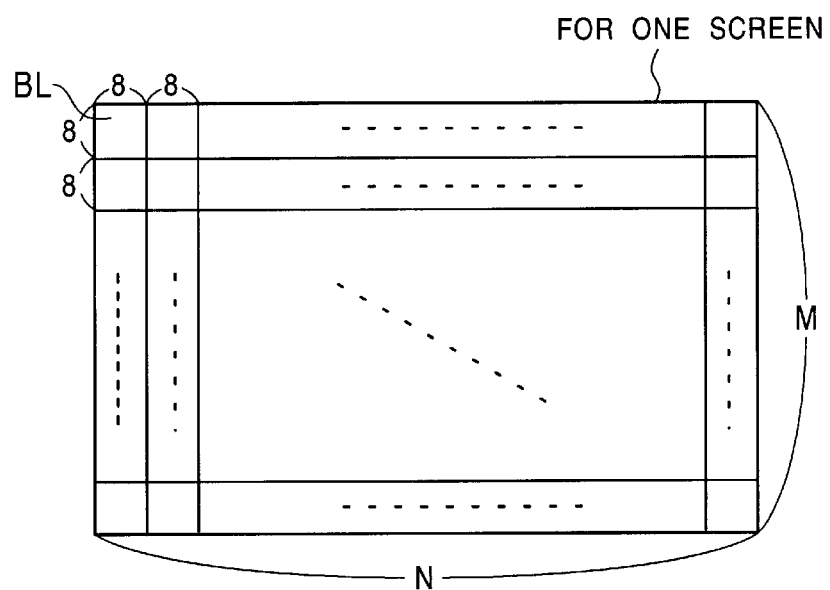
FIG. 2 depicts blocks of pixels within an image frame to illustrate PN code masking on a block by block basis.

Referring to FIG. 2, a pixel blocking scheme is depicted to illustrate a preferable masking pattern generation and dithering technique. In this example, one field (one screen) of the digital video signal Vi is composed of information for N pixels in the horizontal direction and M pixels in the vertical direction. The screen is divided into predetermined blocks of pixels BL, with each pixel block BL formed of 8×8=64 pixels. Other pixel block sizes can alternatively be used. A mask pattern of a size corresponding to this block region BL is generated. The mask pattern of this example is used to determine whether the value of the spread signal corresponding to the respective pixel positions of the 64 pixels of the block region BL is output "as is", or whether the value is set to zero by masking. That is, the mask pattern controls whether or not the spread signal is to be superimposed with individual pixel data. This will be explained further below.

In this example, four types of mask patterns are generated, such as those shown in FIGS. 3A–3D. The number of pixels to be masked per unit block BL is different for each mask pattern. In FIGS. 3A–3D, the portions filled in with black show the respective pixels to be masked.

Figure 3A:
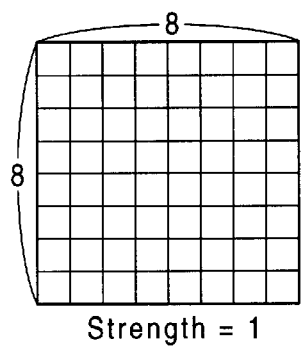
FIGS. 3A–3D are diagrams showing examples of masking patterns that may be used to implement dithering in the embodiment of the present invention.
Figure 3B:
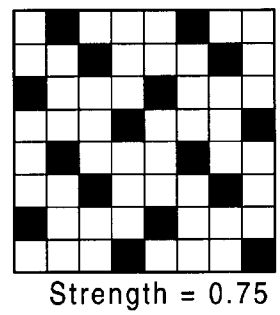
Figure 3C:
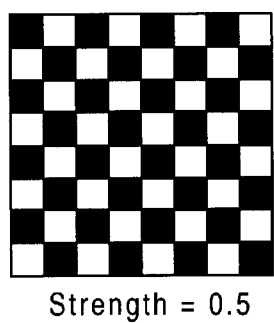
Figure 3D:
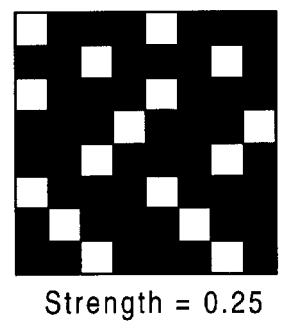

FIG. 3A shows a pattern of superimposition quantity Strength=1 in which none of the pixels within the block region BL are masked. FIG. 3B depicts a pattern of superimposition quantity Strength=0.75 in which 75% of the pixels within the block region BL are not masked. Similarly, FIG. 3C depicts a pattern with Strength=0.5 wherein 50% of the pixels are not masked. In the pattern of FIG. 3D, the Strength=0.25 (25% of the pixels are not masked).

Generation pattern control section 20 controls mask pattern generation section 19 so that one of the above four types of mask patterns is randomly selected, and supplied to dithering processing section 18 in correspondence with a block region BL. The randomly selected mask patterns are applied at times synchronized with a timing signal from timing signal generation section 14. Generation pattern control section 20 controls the random selection method so that the average value of the superimposition quantities Strength of the spread additional information by the mask patterns is a predetermined value less than 1, averaged over an entire screen. The lower the average Strength value chosen (i.e., the higher the average masking level), the less the influence the spread additional information signal has on picture quality. An average Strength value of 0.6 has been found to be satisfactory in terms of picture quality and also for additional information decoding reliability.

When the spread signal after this dithering process is superimposed onto the least significant bit (LSB) of the digital video signal, the superimposition quantity (superimposition level) is lower than if only the spread signal, without any masking, were to be superimposed. That is, if the spread signal from the spreading section 16 were to be superimposed onto the LSB of the digital video signal Vi, the superimposition quantity would be 1.0. The superimposition quantity of the spread signal after the dithering process is 0.6 in the above-described example, whereby the additional information is superimposed onto the digital video signal at a superimposition level lower than the level of the LSB of the digital video signal.

With reference now to FIG. 4, the above-discussed signal spreading and dithering techniques will be further explained with the aid of a specific example. Two adjacent pixel blocks $BL_i$ and $BL_{i+1}$ are depicted, each having 8×8=64 pixels. In this example, each bit of the spread signal output by spreading section 16 is applied to an entire pixel block.

Assume for simplicity that without any additional information superimposed with the video signal, the digital video signal values for each of pixels $P_1$ and $P_2$ of block $BL_i$ and $P_9$ and $P_{10}$ of block $BL_{i+1}$ are the same, namely, 01010011. Also assume that the first two bits of the spread signal output by spreading section 16, i.e., the PN code multiplied by the additional information code, are 10.

If this spread signal were to be superimposed with the video signal without any masking pattern or random noise applied, all pixels in a block would be subject to modification by the spread signal bit allocated to that pixel block. For instance, in the example of FIG. 4, superimposition of the spread signal with the video signal is accomplished by adding the spread signal bit allocated to a pixel block to the LSB of each pixel code, thereby changing the entire binary code of each pixel. (Alternatively, the spread signal bit could always be subtracted from each pixel code, or, a "1" bit could produce an addition of "1" while a "0" results in a subtraction of "1".) Thus, adding a "1" to the image codes of pixels $P_1$ and $P_2$ would result in an image value of 010101000 for pixels $P_1$ and $P_2$; whereas the "0" added to pixels $P_9$ and $P_{10}$ produce no change in those pixels.

When a masking pattern with a Strength less than 1 is applied to the spread signal, a masked spread signal is produced which, when subsequently applied to a pixel block, results in only some of the pixels in the block being subject to modification. Consequently, the overall effect of the spread signal on the image signal is diminished. By way of example, suppose in FIG. 4 that a mask pattern of Strength=0.5 is applied to the spread signal for block $BL_i$, and a mask pattern of Strength=0.75 is applied to spread signal for the next block $BL_{i+1}$. Since the mask pattern of Strength=0.5 has a "mask pixel" in the position of pixel $P_1$, the spread signal bit for pixel P1 is masked. As a result, the LSB of the video signal pixel P1 would not be subsequently modified by the spread signal, and the image code for pixel $P_1$ would remain unchanged at 01010011. On the other hand, the image code for pixel $P_2$ would be modified in accordance with the spread additional information signal. Similarly, pixel $P_9$ of block $BL_{i+1}$ would be subject to modification whereas pixel $P_{10}$ would not, but both of these pixels retain their original values in this example since the spread signal bit is a "0" for block $BL_{i+1}$.

Returning to FIG. 1, in the illustrative embodiment, the spread additional information signal which is dithered by dither processing section 18 is applied to a random noise addition section 21. This section 21 adds high frequency random noise to the signal, causing the additional information to be even more inconspicuous on the reproduction screen. The high-frequency random noise pattern added by the random noise addition section 21 is generated by a random-noise pattern generation section 22. In this example, a number of different random noise patterns of different noise addition quantities are generated, and one of these patterns is randomly selected for each of the block regions BL. The random noise pattern selection is made by a pattern generation control section 23.

FIG. 5 gives an example of different noise addition quantities that may be used for the high frequency noise. The noise addition quantities are selectively controlled by pattern generation control section 23, which may also selectively control which random noise patterns are to be applied. In the example, five different noise addition quantities designated as "+2", "+1", "0", "−1", and "−2" are randomly selected for application to the individual pixel blocks BL. A noise addition quantity of +2 or a −2 has the largest effect on a pixel to which the noise is applied, whereas an addition quantity of "0" has the smallest effect on any given pixel. Merely by way of example, a noise addition quantity of +2 may add a binary value in the range of 01 to 11 to each affected pixel; a noise addition quantity of +1 may add an amount in the range of 01 to 10 to each affected pixel; a noise addition quantity of 0 may add 01 to each affected pixel; and so on. These additions (or subtractions) are supplementary to any addition or subtraction due to the spread/dithered additional information signal prior to the noise addition. Whether or not a particular pixel is affected by the noise depends on the noise pattern selected for the pixel block it resides in.

The listed addition ratios corresponding to the noise addition quantities refer to the approximate percentage of pixels in a pixel block that change value due to the added noise, averaged over a field. For example, when a low level noise quantity of "0" is applied, about 40% of the pixels change value; when +1 is chosen about 20% of the pixels change value, and so forth. It is noted that the noise is considered "high-frequency" because it can affect different pixels within a block differently, rather than producing the same effect on all pixels of a pixel block. That is, the noise occurs at a higher spatial frequency than the PN code of the spread additional information signal.

Different types of high-frequency random noise patterns are applied to the various pixel blocks on a random basis. In other words, different random noise patterns are applied to the spread/dithered additional information signal corresponding to the various pixel blocks, to be subsequently superimposed with the pixel blocks of the video signal. To form different types of random noise patterns, either the same spatial random noise pattern can be used, but with different addition levels, or the same addition level can be used with different spatial noise patterns. For instance, if five different spatial noise patterns are used, with five addition levels, then 5×5=25 types of noise patterns can be generated.

The noise-added additional information from noise addition section 21 is supplied to the additional information superimposition section 12 where it is superimposed onto the digital video signal Vi to modify the same. The modified digital video signal is then forwarded to an optional compression processing section 24 where a compression process such as MPEG compression is performed thereon. The compressed signal is applied to a write processing section 25. This section 25 writes and records the compressed image information with additional information superimposed onto a recording medium, e.g., disk 26.

Figure 6A:
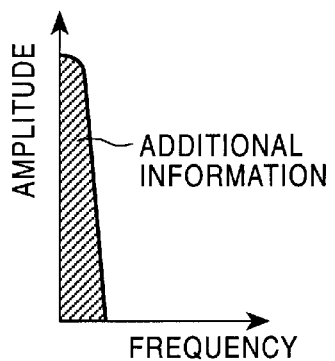
FIGS. 6A–6D are diagrams illustrating a spread spectrum process as a digital watermark process used in the embodiment of the present invention.
Figure 6B:
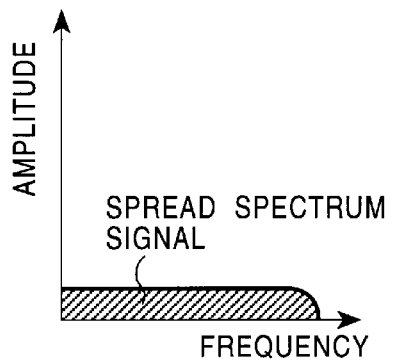

FIGS. 6A–6D illustrate the relationship between the additional information to be superimposed as a spread spectrum signal, and a video signal. As shown in FIG. 6A, the additional information is a signal of a low bit rate such that the amount of information contained therein is small. This signal is also a narrow band signal (although not necessarily a low frequency signal as shown). For instance, the additional information is typically a code of a few bits that occurs once for each image field, thus forming a narrow band signal. When a spread spectrum operation is performed thereon, the signal is converted to a signal of a wide bandwidth, as shown in FIG. 6B. At this time, the level of the spread spectrum signal becomes smaller in inverse proportion to the expansion ratio of the band.

Figure 6C:
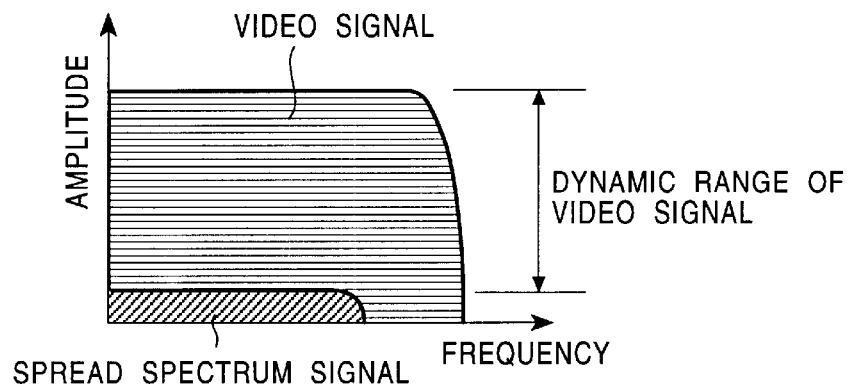

The spread spectrum signal is superimposed onto the digital video signal Vi by the additional information superimposition section 12. In this case, as shown in FIG. 6C, the spread-spectrum signal is superimposed at a level lower than the dynamic range of the video signal as an information signal. Note that the video signal contains higher spatial frequency components than the spread spectrum signal because the spread spectrum signal is allowed to change value every block whereas the video signal may change value every pixel. However, when the dithering/masking pattern and/or high frequency noise are applied, higher spatial frequencies are added such that the frequency range of the spread spectrum signal approaches that of the video signal. In addition, the dithering results in a reduction of the average amplitude level of the spread spectrum signal. As a result, the additional information superimposed onto the video signal becomes more inconspicuous on the reproduction screen.

Figure 6D:
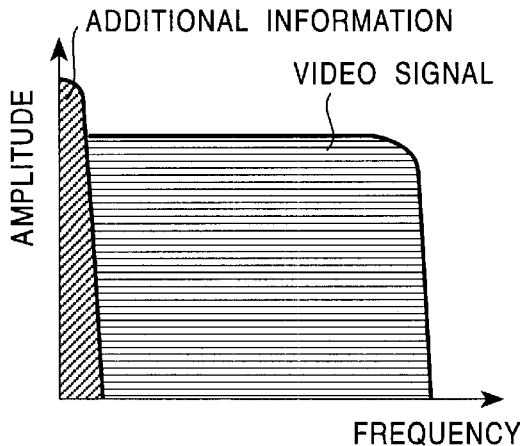

When inverse spreading is performed to detect the additional information, e.g., SS copy control information, as shown in FIG. 6D, the SS copy control information is reconstructed as a signal of a narrow band again. By providing a sufficient spreading ratio, the power of the copy control information after inverse spreading exceeds that of the information signal, making detection possible.

In the above-described embodiment, spectral spreading is performed by using a PN code sequence of a vertical cycle in which a vertical synchronization signal is used as a reference signal. In order to detect the additional information signal from the video signal, the same PN code sequence as used by PN code generator 15 must be known and used for inverse-spreading by an appropriate decoding system. The PN code sequence can be properly timed on the decoding side in accordance with a signal which is synchronized with the vertical synchronization signal detected from the video signal. Thus, with knowledge of the PN code, it is relatively easy obtain code synchronization and to detect the additional information.

FIG. 7 illustrates the influence of the various processing operations already discussed, by using a part of an image on a display as an example. Binary image pattern 31 represents a pattern of the spread spectrum signal from spreading section 16, and is considered to be somewhat conspicuous. When dither processing is performed on the spread spectrum signal using randomly selected masking patterns, after the dithering process the binary image pattern of the spread spectrum signal becomes difficult to perceive, like the image pattern 32. (In FIG. 7, the dither processing is illustrated by a masking switch SW.)

Furthermore, by adding a high-frequency random noise pattern 33 to the signal after this dithering process, the image pattern following noise addition becomes an image pattern such as image pattern 34, and the binary image pattern of the original spread-spectrum signal becomes barely visible. Therefore, the additional information cannot be identified as a specific pattern as the image pattern 31.

In the above embodiment, the generation timing of each chip of the PN code sequence may be completely independent of the block region BL. For instance, the mask patterns and noise patterns may each be applied to 8×8=64 pixel blocks BL while the PN code sequence (multiplied by the additional information signal) is applied to blocks of larger or smaller sizes.

In the above-described embodiment, a mask pattern is dithered for each block region BL or each sub-block of the image information; however, a mask pattern may alternatively be provided for an entire screen, and dithered on a screen by screen basis rather than block by block. For instance, a masking pattern that produces a superimposition quantity of a predetermined value, e.g., 60%, for one screen, may be provided in advance, and a dithering process may be performed using masking patterns that change from screen to screen. Similarly, the random noise pattern can also set in units of one screen.

In addition, the above example describes a scenario in which the masking pattern and the noise pattern are switched in units of the same block or sub-block. As an alternative, the switching of the masking pattern may be performed in different size pixel blocks than for the noise pattern.

Another Embodiment

In the above-described embodiment, it was assumed that each chip of the PN code was allocated to a standard block BL of pixels and, absent masking by the masking pattern, would be allowed to modify the pixel values of all pixels in the block. For instance, in the example given, all pixels in a block are modified if the PN code x additional information code (spread spectrum code) is a 1 for that block, and none are modified if the spread spectrum code is a 0.

In an alternative embodiment, each chip of the spread spectrum code is permitted to modify a maximum of a predetermined portion (e.g., one half) of the pixels in the pixel block. In addition, the particular pixels in a block that are modified are dependent on the PN value of the spread spectrum chip for that block.

Referring to FIGS. 8A and 8B, the alternative embodiment is illustrated. The PN code sequence Spn is generated so that one chip of the PN code sequence Spn corresponds to one or more block regions BL. The block region BL is further divided into four sub-blocks SB formed of 4×4=16 pixels. As shown in FIG. 8A (top diagram), when the value (PN value) of the spread spectrum signal is "0", the spread spectrum signal is superimposed onto the two sub-blocks SB2 and SB3 on the upper right and the lower left of the block region BL, and no spread spectrum signal is superimposed onto the two sub-blocks SB1 and SB4.

In the current example, when the value (PN value) of the spread spectrum signal is "1", as shown in FIG. 8B (top diagram), the spread spectrum signal is superimposed onto the two sub-blocks SB1 and SB4 on the upper left and the lower right of the block region BL, and no spread spectrum signal is superimposed onto sub-blocks SB2 and SB3.

Thus, the superimposition pattern of the spread spectrum signal with respect to the sub-blocks is inverted according to the value of the spread spectrum signal. The effect that the superimposed spread spectrum signal has on the image data depends on the protocol chosen. For instance, a superimposed "0" may result in a subtraction of one bit, e.g., for the pixels of sub-blocks SB2 and SB3 of FIG. 8A, whereas a superimposed "1" may result in an addition of one bit for each affected pixel, e.g., for the pixels of sub-blocks SB1 and SB4 of FIG. 8B. It is noted that a protocol in which the same type of effect is produced on the impacted pixels can alternatively be employed. For example, a PN chip code of "0" can be represented by only the pixels in sub-blocks SB2 and SB3 having a binary "1" added thereto; with a PN chip code of "1" represented by the pixels of only sub-blocks SB1 and SB4 having a "1" added thereto.

Once the spread spectrum pattern is established for a block or blocks, a dithering process and high-frequency noise addition process, such as those described above, are performed with respect to the respective sub-blocks where the spread spectrum signals are to be superimposed. The lower diagrams shown in FIGS. 8A and 8B show how different mask patterns impact the superimposition of the spread spectrum signal on the various pixels. The effect of mask patterns with superimposition quantities ranging from 0.25 to 1.0 are shown for the two cases of FIGS. 8A and 8B. In all cases, the pixels of the darkened sub-blocks that were slated not to be influenced by the spread spectrum signal remain unaffected. If a darkened "mask pixel" corresponds to a pixel that would otherwise be affected by the spread spectrum signal, that pixel now remains unchanged.

Hence, in the embodiment illustrated by FIGS. 8A and 8B, since a spread spectrum signal is not superimposed onto two out of four sub-blocks of each pixel block, the superimposition level is already decreased. Moreover, since a dithering process is performed in units of sub-blocks, the superimposition level is decreased further. Therefore, it is expected that the additional information can be made even more inconspicuous than in the embodiment described earlier.

In this example, during inverse spreading by a decoding apparatus, "0" or "1" of the spread spectrum signal is determined according to the difference in the position of the sub-block within the block region BL in which the spread spectrum signal as additional information is superimposed, and the spread spectrum signal is detected.

In the above-discussed embodiments, the additional information as digital watermark information was described as being a code of several bits which is transformed into a code of many more bits via interaction with a long PN spreading sequence. However, alternative embodiments of the invention can be provided without a means for spreading the additional information signal. As long as the input additional information is provided in a state in which it may appear as a binary image pattern on the screen, as shown in the image pattern 31 of FIG. 7, the present invention can be practiced without the spreading means.

Moreover, in the above illustrative embodiments, both a dithering process and a high frequency random noise addition process are employed to reduce the perceptible effects of the additional information signal superimposed with the image. However, by using just one of the dither processing or the random noise addition processing, without the other, some beneficial effect can also be attained. Thus, the invention can be also be practiced using only one of these processes.

From the foregoing, according to the present invention, additional information can be superimposed with image information in a manner such that the additional information appears inconspicuous on a display, while maintaining the superimposition level at which detection of additional information can be reliably performed.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An additional information superimposition apparatus comprising:

dither processing means for performing a dithering process on additional information of a very low level to be added to baseband image information;

noise addition means for adding a random noise pattern to the additional information on which a dithering process has been performed by said dither processing means; and additional information superimposition means for superimposing the dithered additional information from said noise addition means onto said baseband image information;

wherein said dither processing means is adapted to randomly associate different types of masking patterns with different portions of said additional information signal, each of said portions corresponding to a plurality of pixels of image information, said masking patterns defining masked pixels in which no additional information is to be superimposed with image information.

2. The apparatus according to claim 1, wherein the respective portions of said additional information signal corresponding to a plurality of pixels each correspond to a block of pixels of a predetermined size, such that dithering using randomly selected masking patterns is performed on a block by block basis.

3. The apparatus according to claim 1, wherein the respective portions of said additional information signal corresponding to a plurality of pixels each correspond to a screen of pixels, such that dithering using randomly selected masking patterns is performed on a screen by screen basis.

4. The apparatus according to claim 1, wherein for each block region associated with a plurality of pixels of said image information, said noise addition means adds said random noise pattern having a noise addition quantity randomly selected from a plurality of predetermined different noise addition quantities.

5. The apparatus according to claim 1, wherein:

said additional information is binary information, with each bit thereof associated with a block region of pixels of said image information;

individual block regions are divided into a plurality of sub-block regions;

a pattern of at least one sub-block region is defined for each block region, said pattern corresponding to the value of the additional information bit associated with that block region, the at least one sub-block region defining pixels that may be superimposed with said additional information; and said dithering process determines which pixels of said at least one sub-block region are to be masked from being superimposed with said additional information.

6. The apparatus according to claim 5, wherein individual block regions are divided into four rectangular sub-blocks, and said pattern defines only upper left and bottom right sub-blocks as sub-blocks to be superimposed when said bit is a first value, and only upper right and lower left sub-blocks being superimposed when said bit is a second value.

7. The apparatus according to claim 5, wherein said dither processing means is adapted to randomly associate different types of masking patterns with different portions of said additional information signal, each of said portions corresponding to a plurality of pixels of image information, said masking patterns defining masked pixels in which no additional information is to be superimposed with image information.

8. A method for superimposing additional information of a very low level onto baseband image information, said method comprising:

performing a dithering process on said additional information;

adding a random noise pattern to said additional information on which said dithering process has been performed; and superimposing said additional information with said added random noise onto said baseband image information;

wherein said dithering process comprises randomly associating different types of masking patterns with different portions of said additional information signal, each of said portions corresponding to a plurality of pixels of image information, said masking patterns defining masked pixels in which no additional information is to be superimposed with image information.

9. The method of claim 8, wherein the respective portions of said additional information signal corresponding to a plurality of pixels each correspond to a block of pixels of a predetermined size, such that dithering using randomly selected mask patterns is performed on a block by block basis.

10. The method of claim 8, wherein the respective portions of said additional information signal corresponding to a plurality of pixels each correspond to a screen of pixels, such that dithering using randomly selected mask patterns is performed on a screen by screen basis.

11. The method of claim 8, wherein for each block region associated with a plurality of pixels of said image information, said random noise pattern is added having a noise addition quantity randomly selected from a plurality of predetermined different noise addition quantities.

12. The method of claim 8, wherein:

said additional information is binary information, with each bit thereof associated with a block region of pixels of said image information;

individual block regions are divided into a plurality of sub-block regions;

a pattern of at least one sub-block region is defined for each block region, said pattern corresponding to the value of the additional information bit associated with that block region, the at least one sub-block region defining pixels that may be superimposed with said additional information; and said dithering process determines which pixels of said at least one sub-block region are to be masked from being superimposed with said additional information.

13. The method of claim 12, wherein said dithering process randomly associates different types of masking patterns with different portions of said additional information signal, each of said portions corresponding to a plurality of pixels of image information, said masking patterns defining masked pixels in which no additional information is to be superimposed with image information.

14. An image information recording apparatus comprising:

(a) an additional information superimposition apparatus including:

(i) dither processing means for performing a dithering process on additional information of a very low level to be added to baseband image information, wherein said dithering process comprises randomly associating different types of masking patterns with different portions of said additional information signal, each of said portions corresponding to a plurality of pixels of image information, said masking patterns defining masked pixels in which no additional information is to be superimposed with image information;

(ii) noise addition means for adding a random noise pattern to the additional information on which a dithering process has been performed by said dither processing means; and (iii) additional information superimposition means for superimposing the dithered additional information from said noise addition means onto said image information; and (b) recording means for recording image information in which said additional information is superimposed.

* * * * *